United States Patent [19]

Cooper et al.

[11] 3,823,532

[45] July 16, 1974

[54] FILTER

[75] Inventors: Thomas Henry Cooper, Windsor; Fred Bowman Heil, Jr., E. Hartland, both of Conn.

[73] Assignee: Combustion Engineering, Inc., Windsor, Conn.

[22] Filed: Nov. 14, 1973

[21] Appl. No.: 415,707

[52] U.S. Cl.......................... 55/357, 55/422, 55/481
[51] Int. Cl............................................. B01d 35/12
[58] Field of Search............. 55/309, 422, 478, 479, 55/480, 481, 482, 483, 495, 504, 506, 328, 357

[56] References Cited
UNITED STATES PATENTS

| | | | |
|---|---|---|---|
| 1,436,569 | 11/1922 | Boerum | 55/481 |
| 2,925,144 | 2/1960 | Kroll | 55/422 |
| 3,494,113 | 2/1970 | Kinney | 55/481 |
| 3,546,855 | 12/1970 | Marx | 55/481 |

FOREIGN PATENTS OR APPLICATIONS 1,175,713   8/1964   Germany .............................. 55/481

Primary Examiner—Bernard Nozick
Assistant Examiner—David L. Lacey
Attorney, Agent, or Firm—Frederick A. Goettel, Jr.

[57] ABSTRACT

A filter for use in an air or other suitable gas duct system. The filter is mounted in a frame box which in turn is slidably supported in tracks within a rectangular section of the duct. An extension of the rectangular flow passageway provides a chamber into which the frame and filter may be slidably withdrawn from the duct. This chamber is provided with a removable cover to provide access to the filter for removal and replacement thereof. A further embodiment includes a tandem frame assembly and a second chamber for filter removal extending from the opposing side of the flow passageway section.

9 Claims, 6 Drawing Figures

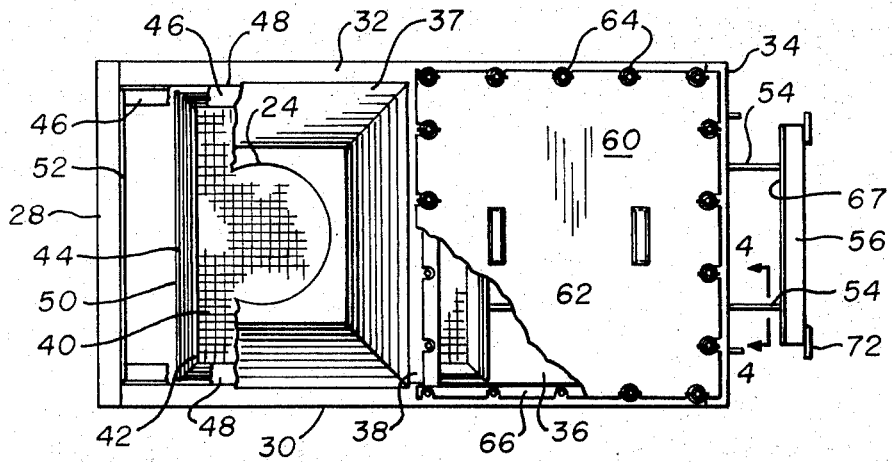
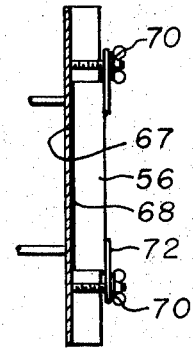
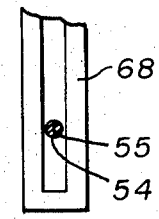
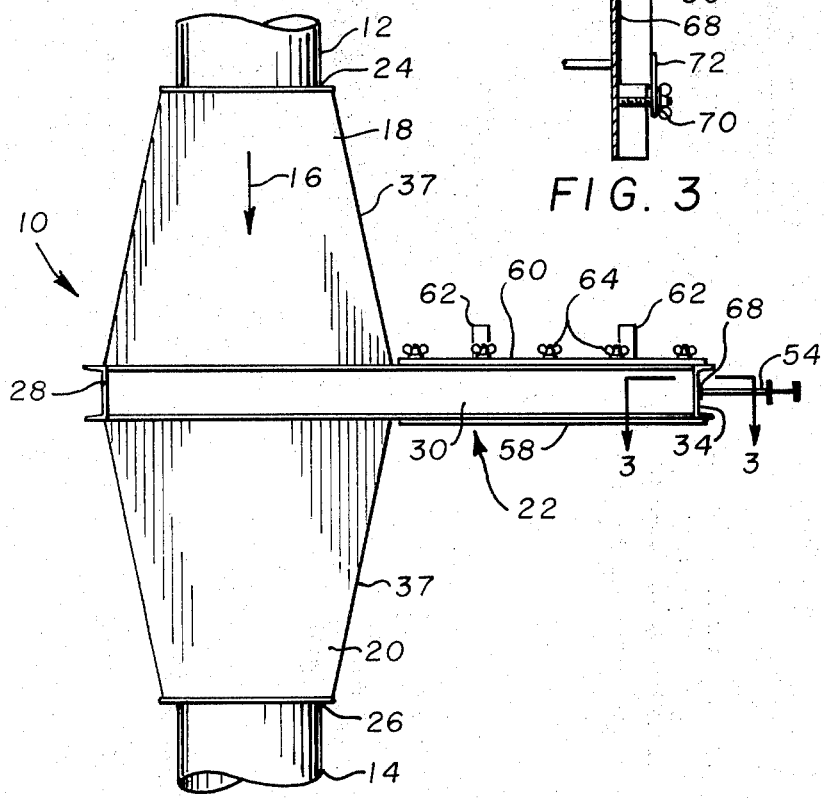

FILTER

BACKGROUND OF THE INVENTION

1. Field of the Invention

This invention relates to air filters and more specifically to an arrangement for providing access to such a filter for removal and replacement.

2. Description of the Prior Art

Many applications require a continuous supply of large quantities of clean filtered air or gas. Filter banks employing replaceable cartridges are often located in association with ductwork leading to or from such banks of filters. To provide access to the filter bank for cartridge replacement has in many applications required access to and disassembly of the ductwork for removal of an insertion of replacement filter cartridges. In other applications the provision of an opening in the ductwork for filter cartridge removal and replacement has resulted in high levels of leakage through these openings.

SUMMARY OF THE INVENTION

A filter for use in an air or other gas ductwork system. The filter media is mounted in a filter box which is slidably disposed within a filter enclosure housing. The filter enclosure has two positions or chambers within the housing, one is coincident with the air flow passageway and the other outside of the passageway. The filter box is mounted in tracks within the filter enclosure so that it may be slidably moved from its operating position in the air flow passageway to the second position where a removable cover is provided to permit access to the chamber for quick removal and replacement of the filter media.

Another embodiment, includes a tandem filter frame assembly and a second chamber for filter removal extending from the opposing side of the air flow passageway section. The second chamber is provided with tracks to guide the filter frame and a removable cover. This arrangement insures that a filter is always interposed in the gas flow passageway and that a change of filter media can be accomplished with a minimum of flow interruption.

BRIEF DESCRIPTION OF THE DRAWINGS

FIG. 1 is an elevational view of one embodiment of the invention.

FIG. 2 is a plan view partly in section of the embodiment shown in FIG. 1.

FIG. 3 is a sectional view taken on the line 3—3 of FIG. 1.

FIG. 4 is a view taken on the line 4—4 of FIG. 2.

DESCRIPTION OF THE PREFERRED EMBODIMENTS

Figure 5:
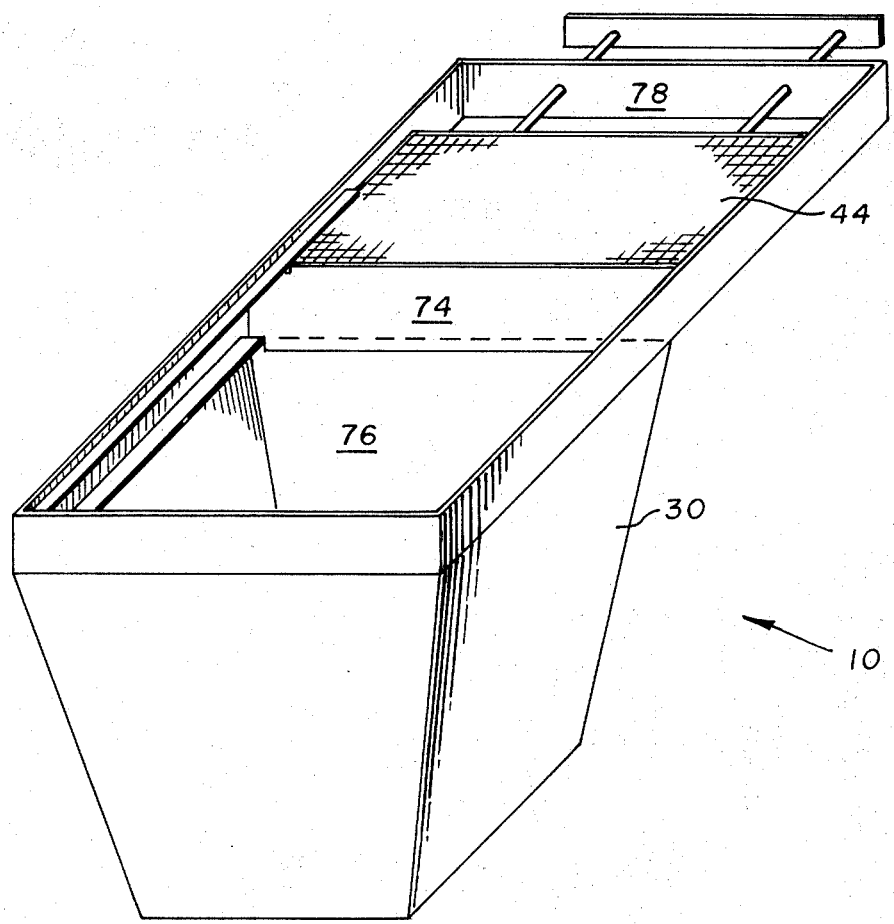
FIG. 5 is a partial view of a modified embodiment of the invention.

Referring to FIG. 1, numeral 10 represents a filter arrangement in a ductwork system. For purposes of explanation the upper circular duct 12 will be referred to as the inlet duct and the lower circular duct 14 will be referred to as the outlet duct. The direction of flow through the filter is thus downward as indicated by the arrow 16.

Referring now to both FIGS. 1 and 2, the outer structure of the filter arrangement is made up of a pair of duct sections 18 and 20, in the form of truncated pyramids, arranged base-to-base and having the rectangular filter containment section or enclosure 22 disposed therebetween. Each of the pyramidal duct sections 18, 20, includes a circular opening 24, 26 at its outer end to which the inlet duct 12 and the outlet duct 14, respectively, are welded.

The outer perimeter of the filter enclosure 22 is formed from four U-shaped steel channels 28, 30, 32 and 34, suitably interconnected, as by welding and arranged with their flange portions extending outwardly. The portion of the filter enclosure 22 coincident with the flow passageway will be referred to hereinafter as the flow passageway section. The two side channels 30, 32, extend out beyond the ductwork boundary a distance greater than the width of the filter media to form the boundaries of the chamber 36 into which the filter is withdrawn when replacing the filter media, as will be more fully described hereinbelow.

The upper and lower pyramidal duct sections 18, 20 are welded to the upper and lower sides respectively of three of the channels 28, 20 and 32, to form a gas tight seal therebetween. The fourth side 37 of each of the pyramidal ducts is welded to a suitable strip extending between the inner edges of the two side channels 30, 32. The strip on the inlet side is shown in FIG. 2 as 38, the lower strip is of a similar construction and is not shown in the drawing.

The filter media itself 40 is an expendable commercially available filter such as the Micromat "CHP" manufactured by the Microtron Corp. This replaceable filter is contained within a filter frame 42 such as the Micromat Tuck-In Filter Frame also manufactured by the Microtron Corp. The filter frame 42 in turn is mounted within a rectangular drawer type frame 44 made from suitable strip material so as to firmly receive the filter/filter frame assembly therein.

The drawer frame 44 is slidably mounted within the filter containment section 22 on two sets of parallel tracks 46. These tracks 46 are formed by upper and lower track sections which overlap two of the outside edges 48 of the filter drawer 44 to form a seal therebetween when air is flowed through the filter. The third outside edge 50 of the filter drawer 44 is sealingly supported by a narrow ridge 52, welded to the inside of the channel 28. The fourth edge of the drawer 44 engages the lower strip, similar to upper strip 38, which extends between the side channels 30, 32. Thus, when the filter drawer 44 is fully inserted into the flow passageway section, a leakproof seal is formed around the entire outer perimeter of the drawer. A pair of elongated rods 54 are attached to the fourth edge of the drawer 44 and extend through the filter containment section out through suitable openings 55 in the U-shaped channel 34 and are attached to a handle 56 on the exterior of the assembly.

The portion of the filter containment section 22 extending beyond the ductwork is designed to be air tight when fully assembled with the filter fully inserted, and to permit easy access to the filter media when the filter drawer is withdrawn. The bottom of this filter withdrawal section is formed by a suitable plate 58 welded to the lower side of the three U-shaped channels 30, 32 and 34, and to the lower strip extending between channels 30 and 32. The top of the filter withdrawal section is formed by a removable plate 60 which is provided with handles 62 for easy removal. This plate is attached to the upper side of the channels 30, 32 and 34, and to the upper strip 38 by a series of threaded stud and wing nut assemblies 64. A sealing gasket 66 is provided all around to insure an air tight seal when the cover is installed.

Referring now to FIGS. 2, 3 and 4 the handle 56 includes a flat section 67 facing the outside of the channel 34 which engages a seal gasket 68 attached to the channel so as to encircle the opening 55 in the channel through which the rods 54 extend. Accordingly, when the filter drawer 44 is fully inserted into the flow passageway section the flat section 67 of the handle sealingly engages the gasket 68. The handle 56, and thus the entire filter assembly, is held in this position by threaded stud/wing nut assemblies 70 which engage extensions 72 on each side of the handle 56.

The assembly as thus described provides an air tight, yet simple assembly which insures that all air passing to the outlet duct 14 has passed through the filter 40 and that no air leaks from the filter assembly through the cover 60 or handle openings 55.

For monitoring the flow through the filter differential pressure taps may be installed on the inlet and outlet sides of the filter. Such an arrangement may be used to actuate signals indicating that the filter is plugged and in need of replacement, or also to indicate that the unit is being operated in an abnormal mode, such as without a filter installed. An arrangement such as this is described in considerable detail in U.S. Pat. No. 3,488,928 entitled, "Dual Filter" by F. E. Tarala.

When it is determined that the filter media 40 is in need of replacement the handle wing nuts 70 are removed and the handle 56 pulled outwardly to withdraw the filter drawer 44 from the flow passageway. The wing nuts 64 attaching the cover plate 60 are then removed so that the plate itself may be removed. The used filter media 40 may then be removed and a new one quickly installed. The cover plate 60 is then placed in position and resecured and the filter drawer 44 inserted back into the flow passageway. The handle 56 is then resecured by wing nut/stud assemblies 70 to hold the filter drawer 44 in place and to insure an airtight seal between the handle 56 and the gasket 68.

Referring to FIG. 5 an embodiment of the invention is shown which includes a seal plate 74 on the outside edge of the filter drawer 44. This plate is shaped so as to provide a sealing surface between the flow passageway 76 and the filter withdrawal chamber 78 of the filter containment section. Such an arrangement permits changing of the filter media without interrupting the air flow and with a minimum of leakage from the filter assembly. The upper portion of the filter assembly is not shown in this view to facilitate illustration of this feature.

Figure 6:
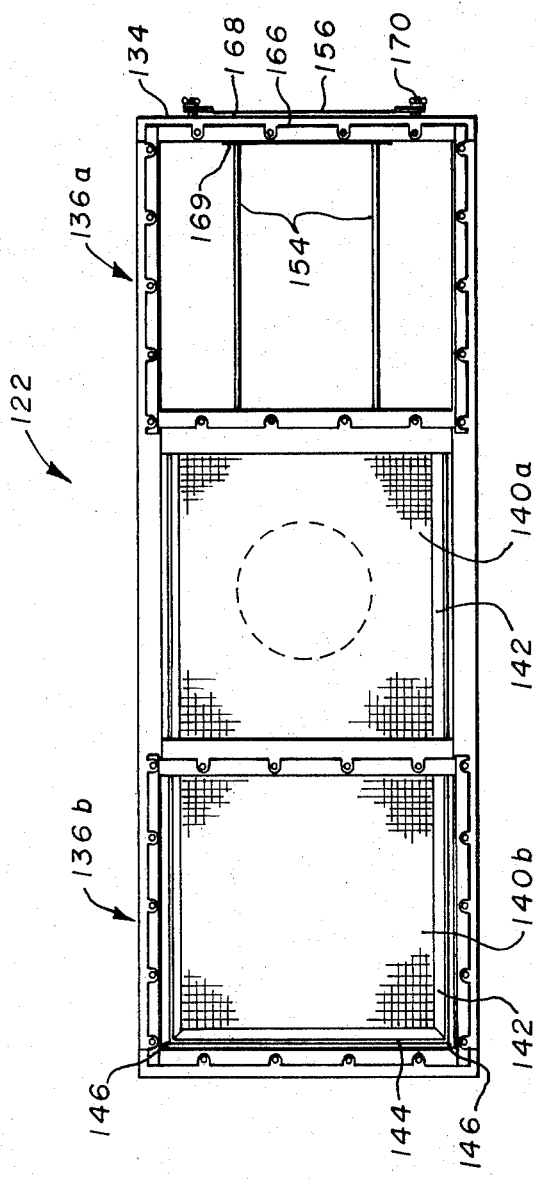
FIG. 6 is a partial view of a further embodiment of the invention.

Referring now to FIG. 6 there is shown a plan view of a further embodiment of the invention wherein the filter drawer 144 includes two filter frame sections 142 interconnected, as by welding or being bolted together, to move together in a tandem arrangement. The filter enclosure 122 includes a second filter withdrawal chamber 136b which extends from the opposite side of the flow passageway section from which the first withdrawal chamber 136a extends.

The second filter withdrawal chamber 136b includes a cover (not shown) which is removably attached to the upper side of the channels which form the sides of the chamber in exactly the same manner as the cover of the previously described embodiment. The parallel tracks 146 are extended along the full length of the side walls of the chamber 136b to provide sealing and support for the tandem filter drawer assembly 144.

The first withdrawal chamber 136a is identical in all respects to the filter removal chamber of the first embodiment and further includes a second gasket 169, of the same shape as the first gasket 168 (or 68), which is attached to the inner wall of the end channel 134 so as to encircle the openings through which the rods 154 pass.

The only difference between the second chamber 136b and the first chamber 136a are the holes provided in the end channel 134 through which the elongated rods 154 pass and the gaskets 168 and 169 and attachment studs 170 which are provided on the first chamber 136a.

The above described arrangement permits withdrawal of a dirty filter from the flow passageway, and removal through one of the chambers 136a, b, while containing continuous filtration of the air flow. Several operating modes and filter change sequences are possible. For example, referring to FIG. 6, when the filter 140a is in need of replacement, the handle 156 is unsecured and pulled outwardly. The filter 140a is thus withdrawn into chamber 136a and the filter 140b pulled into position in the flow passageway to provide uninterrupted filtration of the gas or air flow. The cover (not shown) of chamber 136a is then removed, the dirty filter 140a removed and replaced by a clean filter and the cover reinstalled. The filter system may now be left in this position until the next filter change is required. Leakage of air from the chamber 136a through the openings through which the rods 154 pass is prevented by the engagement of the end of the filter drawer 144 to which the rods 154 are attached with the second sealing gasket 169 which is provided on the inside of the channel 134. When the filter 140b becomes dirty the handle 156 would be pressed inward to move the filter 140b back into chamber 136b and the new filter 140a into the flow passageway. The dirty filter 140b would then be removed and replaced by a clean filter by removal of the cover to chamber 136b as was done with the previous embodiment.

Alternatively, the handle 156 could be used to push the new filter 140a back into the flow passageway immediately following replacement of the filter 140a and the above operation repeated when this filter again became dirty. Filter 140b would thus only be used for filtration during the periods when the filter 140a was being replaced. Thus the filter 140b would see little use during each cycle and would require removal and replacement only at extended intervals.

While these preferred embodiments of the invention have been shown and described, it will be understood that they are merely illustrative and that changes may be made without departing from the scope of the invention as claimed.

What is claimed is:

1. A filter comprising: an inlet duct section; an outlet duct section; a filter enclosure disposed between and attached to said outlet and inlet duct sections and having four rectangularly disposed side walls, said enclosure defining a flow passageway section in flow communication with said inlet and outlet duct sections, and a filter withdrawal chamber comprising an outward extension of said flow passageway section, said chamber having a bottom wall and a detachably mounted top plate; filter box means slidably disposed within said filter enclosure for sliding movement between said flow passageway section and said filter withdrawal chamber; an expendable filter media contained within said filter box means; and handle means attached to said filter box means and extending to the exterior of said filter enclosure for causing said filter box means to move between said flow passageway section and said filter withdrawal chamber.

2. A filter as defined in claim 1 and further including parallel track means attached to the inner faces of opposing walls of said filter enclosure, and extending the full length of said flow passageway section and at least partway into said filter withdrawal chamber said track means sealingly receiving opposing parallel sides of said filter box means, for guiding said filter box means in its sliding movement between said filter withdrawal chamber and said flow passageway section and for preventing leakage past said filter box means.

3. A filter as defined in claim 1 wherein said handle means comprises: at least one elongated rod attached to said filter box means and extending through a mating opening in the wall of said filter enclosure spaced farthest from said flow passageway section; a handle portion attached to the end of said rod exterior of said filter enclosure and having a flat surface facing the exterior of said wall containing said opening, said rod being of such a length that when said filter box means is fully inserted into said flow passageway said flat surface engages the exterior of said wall thereby preventing leakage through said opening.

4. A filter as described in claim 3 further including a sealing gasket attached to said exterior of said wall and surrounding said opening through which said rod extends, and means for removably fastening said handle to said exterior of said wall thereby compressing said gasket to further insure that leakage does not occur through said opening.

5. A filter comprising: an inlet duct section; an outlet duct section; a filter enclosure disposed between and attached to said outlet and inlet duct sections and having four rectangularly disposed side walls, said enclosure defining a flow passageway section in flow communication with said inlet and outlet duct sections, a first filter withdrawal chamber comprising a first lateral extension of said flow passageway section, and a second filter withdrawal chamber comprising a second lateral extension of said flow passageway, said first and second chambers each having bottom walls and detachably mounted top plates, said first chamber and said second chamber further being positioned on opposite sides of said flow passageway section and being in longitudinal alignment with each other and with said flow passageway section; filter box means slidably disposed within said filter enclosure for sliding movement between a first position wherein a portion of said filter box means extends across said flow passageway section and is moveable to said first chamber and a second position wherein a portion of said filter box means extends across said flow passageway section and is moveable to said second chamber; two expendable filter media of equal size contained within said filter box means in side-by-side relation; and handle means attached to said filter box means and extending to the exterior of said filter enclosure for causing said filter box means to move between said first and second positions.

6. A filter as defined in claim 5 further including parallel track means attached to the inner faces of opposing side walls of said filter enclosure and extending substantially the full length of said flow passageway section and said second filter removal section and at least partially into said first filter removal section, said track means sealingly receiving opposing parallel sides of said filter box means, for guiding said filter box means in its sliding movement between said first and second positions and for preventing leakage past said filter box means.

7. A filter as defined in claim 6 wherein said handle means comprises: at least one elongated rod attached to said filter box means and extending through mating opening in the wall of said first filter removal section of said filter enclosure which is spaced farthest from said flow passageway section; a handle portion attached to the end of said rod exterior of said filter enclosure and having a flat surface facing the exterior of said wall containing said opening, said rod being of such a length that when said filter box means is fully inserted into said flow passageway said flat surface engages the exterior of said wall thereby preventing leakage through said opening.

8. A filter as described in claim 7 further including a sealing gasket attached to said exterior of said wall and surrounding said opening through which said rod extends, and means for removably fastening said handle to said exterior of said wall thereby compressing said gasket to further insure that leakage does not occur through said opening.

9. A filter as described in claim 8 further including a second sealing gasket attached to the interior of said wall and surrounding said opening through which said rod extends.

* * * * *